Figure 1:
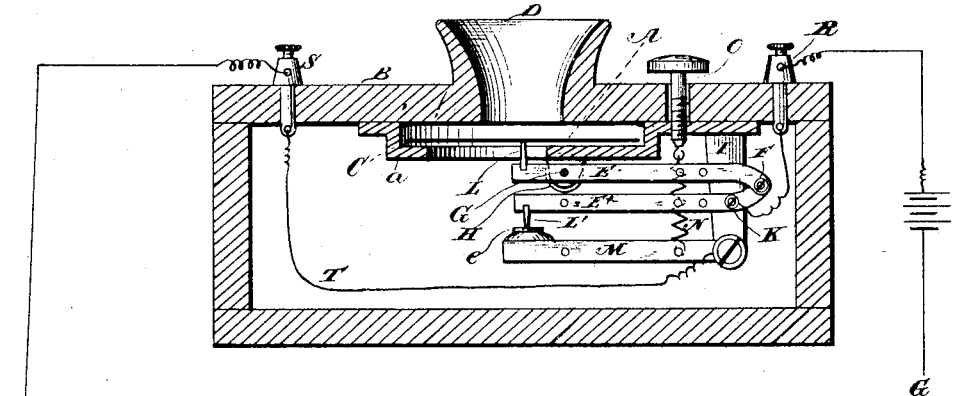

(No Model.)

C. A. RANDALL.
TELEPHONE RELAY.

No. 255,333. Patented Mar. 21, 1882.

Witnesses
Robert Everett
Albert H. Norris

Inventor:
Charles A. Randall
By James L. Norris
Atty.

UNITED STATES PATENT OFFICE.

CHARLES A. RANDALL, OF NEW YORK, N. Y.

TELEPHONE-RELAY.

SPECIFICATION forming part of Letters Patent No. 255,333, dated March 21, 1882.

Application filed September 19, 1881. (No model.)

*To all whom it may concern:*

Be it known that I, CHARLES A. RANDALL, a citizen of the United States, residing at the city, county, and State of New York, have invented new and useful Improvements in Telephone-Relays, of which the following is a specification.

This invention relates to certain improvements in telephonic relays and apparatus in which the vibrations of a diaphragm in the transmitting-instrument cause electrical pulsations, currents, or waves to flow over the main line to actuate a receiving apparatus.

In the existing methods of transmitting sounds by means of a battery and an induction-coil by varying the intensity of the primary current without interrupting the same—that is, by merely weakening or strengthening the continuous contact at the transmitter—the variation of contact is very limited, and the changes in the electro-motive force of the current are comparatively small. Consequently the effect at the receiving-instrument is not very strong or marked, especially at long distances. Owing to the very weak pulsations thus obtained the receiving-instrument is required to be very delicately constructed and sensitive, in order to be affected thereby, and such instruments are often rendered useless, even on very short circuits, by induction from other lines or conductors.

This invention has for its object to overcome these disadvantages, and to amplify at the receiver the effect of the vibrations of the diaphragm of the transmitter; and to this end it consists, first, in a telephonic system, a battery main-line circuit, including a transmitter, with a magnet in said circuit, a tension-regulator operated by said magnet and included in a battery local circuit, which also includes the primary of an induction-coil, the secondary circuit of said coil, including a receiver, whereby the main-battery currents are caused to traverse the main line and the full electro-motive force of the local current is utilized for actuating the diaphragm of the receiver, substantially as and for the purpose hereinafter specified; second, in the combination, with an electro-magnet with a compound lever, a long arm of one member of which carries an armature arranged in front of the core of said magnet, while the short arm of the other member is connected with one member of a contact-maker, including a local circuit, in which is embraced the primary circuit, of an induction-coil the secondary circuit of which includes a telephonic receiver, all as hereinafter more fully described; third, in a system of telephonic telegraphy, the combination of an electrically-closed main-line circuit over which currents of varying electro-motive force are caused to flow in transmission, a telephonic receiver in a local circuit, operated by intermittent alternating currents, and a telephonic relay interposed between the said receiver in the local circuit, as set forth, and the transmitter.

Figure 2:
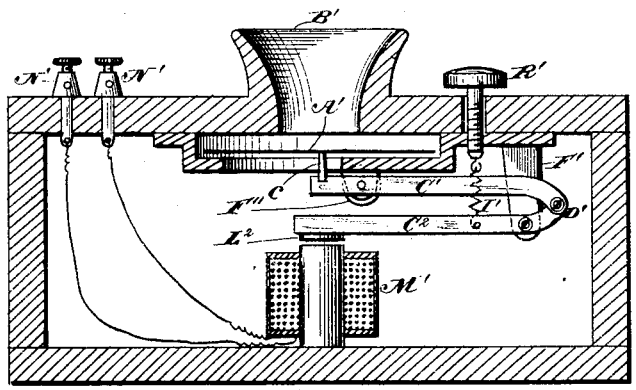
Figure 3:
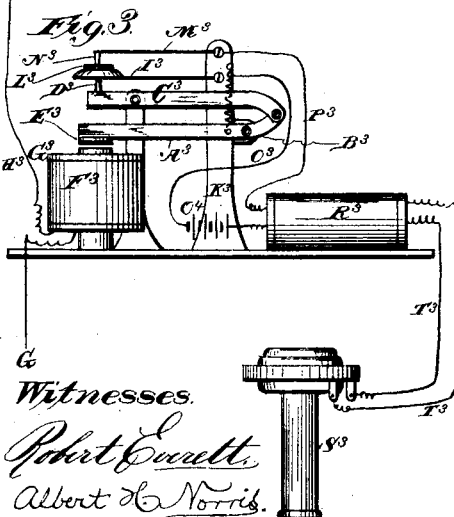
Figure 4:
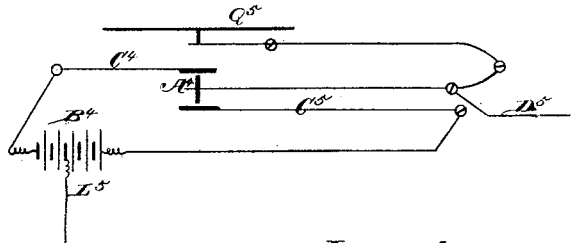

In the accompanying drawings, Figure 1 is a view partly in section of a telephonic transmitter which I use in my improved system. Fig. 2 is a view partly in section of a receiver suitable for use in my improved system. Fig. 3 is a side elevation of my improved telephonic relay, having a receiver connected in the local receiver-circuit. Fig. 4 is a diaphragm illustrating a modified form of transmitter for sending intermittent currents of alternately opposite polarity or direction.

The letter A indicates the diaphragm of a telephonic transmitter, secured to a plate or support, B, by means of an annulus, $a$, which is recessed at C to form an air-chamber, through which extends the usual mouth-piece or air-chamber, D.

The letters E E' indicate a compound lever, consisting of two frames bent or curved and pivoted together, as indicated at F. The arm E is pivoted at G to suitable support, H, and the arm E' to a support, I, at K. The free end of the arm E is provided with a point, L, which impinges against the center of the diaphragm, and the arm E', near its free end, is provided with a pointer, L', which abuts against a carbon disk, $e$, at the end of an arm, M, pivoted to the standard I, which is made of insulating material, the parts E', L', $e$, and M forming a varying contact-maker. The arm M is adjusted to the proper position to bear with proper pressure against the point L' by means of a spring, N, and set-screw O. The compound lever is connected by means of a wire with a binding-post, R, and the arm M with a similar post, S, by a wire, T, by means of which the transmitter may be put in circuit with a battery and receiving-instrument. The battery may be used upon the main-line circuit or in the primary circuit of an induction-coil, as may be desired.

The letter A′, Fig. 2, indicates the diaphragm of a telephonic receiver, mounted in a suitable support, and B′ the ear-trumpet.

The letters C′ C² indicate a compound lever similar to the compound lever of the transmitting-instrument before mentioned. The arms of said levers are pivoted together at D′, and are fulcrumed to supports F′ F″.

The letter I′ indicates a spring, and R′ a set-screw by means of which the levers may be adjusted. The end of the arm C² of the compound lever is provided with a soft-iron armature, L².

The letter M′ indicates an electro-magnet supported so that the upper end of its soft-iron core will come directly under the armature L². The helix of said magnet is connected to the binding-posts N′, by means of which connection may be made with the local or main circuit. Any of the known forms of receiver may be used in my system, however.

Though a limited movement of the armature L² may be obtained, the parts may be differently arranged, the position of the armature L² and point $c$ being reversed, so that the motion of the armature will be decreased and that of the point $c$, and consequently of the diaphragm, increased.

Fig. 3 represents my improved telephonic relay to be employed in my improved system.

The letter A³ indicates a compound lever similar in all respects to the compound lever of the receiver described. Said lever is fulcrumed at B³ and C³, and has a point, D³, at the end of one arm and an armature, E³, at the end of the other.

F³ indicates an electro-magnet, the helix of which is to be connected with the main circuit.

The letter I³ indicates a spring-bar secured to the standard K³, and carrying at its free end a carbon-plate, L³, against which the point D³ bears.

The letter M³ indicates a spring-bar, similar to the bar I³, supported by the standard K³, and having a point, N³, at its free end, which bears against the upper face of the carbon L³, or is in close proximity thereto. The spring-bars I³ and M³ are insulated from each other and connected by wires O³ P³ with a local battery, O⁴, and the primary circuit of an induction-coil, R³, the secondary circuit of which is connected with an ordinary telephonic receiver, S², by means of wires T³ T³.

In Fig. 4 is represented a modification of a transmitter for sending signals or messages, in which alternate positive and negative pulsations are produced by the vibrations of the diaphragm through the medium of the compound lever before mentioned. In this case one end of the lever is provided with a pointer bearing against the diaphragm Q⁵, while the other is provided with a double pointer, A⁴, arranged to vibrate between two carbon-plates, connected respectively to the positive and negative poles of a battery by means of wires C⁴ C⁵. The line-wire D⁵ is connected with the compound lever, and the battery is connected with the ground by means of a wire, L⁵.

The operation of my invention is as follows: The transmitting-instrument, of any suitable construction, but preferably that shown in Fig. 1, should be connected in circuit with the electro-magnet F³ of the relay, and a receiver of any suitable construction—for example, the Bell receiver, as shown at S³, or a receiver of the form shown in Fig. 2—should be connected up in the local receiver-circuit, as shown, by the wires T³ T³. Upon speaking into the mouth-piece of the transmitter the diaphragm will be vibrated, as in the ordinary telephone, and the vibrations will be communicated to the compound lever. As the short arm of the upper branch, E, of the lever carries the pointed bearing against the diaphragm, and the long arm of said branch E is connected to the short arm of the branch E′, it will be perceived that the vibrations of the point L′ will have much greater amplitude than the point L. The variation of the pressure at the contact-maker or tension-changer will thus be greatly increased, resulting in a corresponding increase in the intensity of the pulsations transmitted over the main line. The electric pulsations, acting upon the electro-magnet at the relay, vibrate the armature on the compound lever A³, which transmits such vibrations to the contact-maker or tension-changer. The vibrations are converted by the contact-maker or tension-changer into electric pulsations or waves from the local battery, and are transmitted through the primary circuit of the induction-coil, causing induced currents of great intensity in the secondary coil, which forms a part of the local receiver-circuit containing the telephonic receiver, whereby the pulsations are converted into vibrations of the diaphragm of great force, resulting in an increase in the loudness and the distinctness of the articulation.

Where messages or signals are to be transmitted, instead of varying the tension of the electric circuit by means of a varying pressure at the contact-maker, the contact L′ $e$, Fig. 1, and L³ N³, Fig. 3, may be converted into a circuit-closer by proper adjustment of the parts, so that the circuit from the battery will be made and broken. The time of making and breaking, depending upon the vibration of the diaphragm or armature and the electro-motive force set up in the line-circuit, will vary with the amplitude of the vibration of the diaphragm or armature and the time and force of the contact between the points L′ $e$ L³ N³. I thus obtain currents of strong electro-motive force, which will not be counteracted by induction, and not merely variations of a known electro-motive force.

The term "contact-maker" I apply to contact-points at which the circuit is not broken, the contact being varied by pressure; and the term "circuit-closer" I apply to contact-points at which the circuit is made and broken.

I am aware that a telegraphic relay has heretofore been invented in which the circuit is constantly closed by carbon contact-points, the pressure between the contact-points being varied by the action of an electro-magnet, and I do not claim such a relay; nor do I claim carbon contact-points at all; nor do I claim broadly the combination, with a telephonic transmitting-instrument and its line-circuit, of a distant electro-magnet, a tension-regulator acted upon by such magnet, a local circuit passing through the tension-regulator, and an inductorium with the receiver in its secondary circuit.

The following features, for which claims are made in a separate application filed by me on the 7th of April, 1879, of which this is a division, are not claimed in the present case.

First, the combination of the magnet and its armature with the diaphragm, and a mechanical device for increasing movement, connected with the said diaphragm and the armature, whereby a vibratory movement of the said diaphragm may impart a movement of greater amplitude to the armature.

Second, a receiving-telephone embodying, in combination, the magnet-core, a helix, the vibrating diaphragm, and the lever having its fulcrum nearer the diaphragm than of the magnetic core, carrying at one end an armature in front of the magnetic core, and its opposite ends being in contact with the diaphragm.

Third, a receiving and transmitting telephone embodying, in combination, a diaphragm operating solely as a vibrating element, a magnetic core, a helix, and a lever having its fulcrum located between the center of the diaphragm and the core, and vibratively operated as an armature in front of the magnetic core by the vibrations of the diaphragm in transmitting and vibratively operated by the influence of the magnetic core in receiving, for vibrating the diaphragm.

Having thus described my invention, what I claim is—

1. The combination, in a telephonic system, of a battery main-line circuit, including a transmitter, with a magnet in said circuit, a tension-regulator operated by said magnet and included in a battery local circuit, which also includes the primary of an induction-coil, the secondary circuit of said coil including a receiver, whereby the main-battery currents are caused to traverse the main line and the full electro-motive force of the local current is utilized for actuating the diaphragm of the receiver, substantially as and for the purpose specified.

2. The telephonic relay consisting of a compound lever composed of two arms pivoted together and fulcrumed, as more fully hereinbefore described, an electro-magnet in the main circuit for actuating the lever to transmit the vibrations produced by electric currents, waves, or pulsations over the main line, a contact-maker or tension-changer, to which said waves or vibrations are transmitted, the local-battery circuit, including the primary of an induction-coil, in which said contact-maker is placed, the secondary circuit of said induction-coil, and the receiving-telephone therein.

3. The combination of the electro-magnet $F^3$, the compound lever, the long arm of one member of which carries an armature arranged in front of the core of said magnet, while the short arm of the other member is connected with one member of a contact-maker, including a local circuit, in which is embraced the primary circuit of an induction-coil, the secondary circuit of which includes a telephonic receiver, substantially as described.

4. In a system of telephonic telegraphy, the combination of an electrically-closed main-line circuit, over which currents of varying electro-motive force are caused to flow in transmission, a telephonic receiver in a local circuit operated by intermittent alternating currents, and a telephonic relay interposed between the said receiver in the local circuit and the transmitter, as set forth.

In testimony whereof I have hereunto set my hand in the presence of two subscribing witnesses.

CHARLES A. RANDALL.

Witnesses:
JAMES L. NORRIS,
ALBERT H. NORRIS.